(12) United States Patent
McKay

(10) Patent No.: US 9,194,514 B2
(45) Date of Patent: Nov. 24, 2015

(54) FITTING WITH COMPLEMENTARY FITTING MATERIALS

(75) Inventor: Albert A. McKay, Stoney Creek (CA)

(73) Assignee: LOKRING TECHNOLOGY CORPORATION, Willoughby, OH (US)

(*) Notice: Subject to any disclaimer, the term of this patent is extended or adjusted under 35 U.S.C. 154(b) by 528 days.

(21) Appl. No.: 11/539,998

(22) Filed: Oct. 10, 2006

(65) Prior Publication Data

US 2007/0108760 A1    May 17, 2007

Related U.S. Application Data

(60) Provisional application No. 60/725,582, filed on Oct. 11, 2005.

(51) Int. Cl.
*F16L 13/14*    (2006.01)

(52) U.S. Cl.
CPC .................................... *F16L 13/146* (2013.01)

(58) Field of Classification Search
USPC ......... 285/905, 923, 382, 382.1, 382.2, 382.7
See application file for complete search history.

(56) References Cited

U.S. PATENT DOCUMENTS

| | | | | |
|---|---|---|---|---|
| 2,181,343 A | * | 11/1939 | Reimschissel | 285/339 |
| 4,482,170 A | * | 11/1984 | Jacobson et al. | 285/55 |
| 4,482,174 A | | 11/1984 | Puri | |
| 4,491,347 A | | 1/1985 | Gustafson | |
| 4,626,001 A | | 12/1986 | Lee | |
| 4,650,228 A | * | 3/1987 | McMills et al. | 285/381.4 |
| 5,110,163 A | * | 5/1992 | Benson et al. | 285/382.2 |
| 5,114,191 A | | 5/1992 | Sareshwala | |
| 5,181,752 A | | 1/1993 | Benson et al. | |
| 5,305,510 A | | 4/1994 | Croft | |
| 5,405,176 A | | 4/1995 | Babel et al. | |
| 5,709,418 A | | 1/1998 | Benson et al. | |
| 6,131,964 A | * | 10/2000 | Sareshwala | 285/382 |
| 6,434,808 B1 | | 8/2002 | McKay | |
| 6,692,040 B1 | * | 2/2004 | McKay et al. | 285/382 |
| 2005/0264006 A1 | | 12/2005 | McKay | |
| 2006/0186666 A1 | | 8/2006 | McKay | |

OTHER PUBLICATIONS

Alaskan Copper Works online Catalogue from Feb. 3, 2004.*

(Continued)

*Primary Examiner* — David E Bochna
(74) *Attorney, Agent, or Firm* — Fay Sharpe LLP

(57) ABSTRACT

A fitting assembly for maintaining a leak free seal connection with an associated fluid conduit during and after exposure to extreme heat is provided. The fitting assembly includes a coupling body including an inside surface defining a bore for receiving the associated fluid conduit. The coupling body is made of a first corrosion resistant material having a first coefficient of thermal expansion. The at least one ring is made of a complementary second corrosion resistant material having a second larger coefficient of thermal expansion such that the second material will expand at a greater rate that the first material during heating to a first temperature generally exceeding annealing temperatures of both the first material and the second material. The second material contracts at a greater rate that the first material during subsequent cooling to a second temperature below the annealing temperatures thereby restoring compressive and tensile stresses in the associated fluid conduit and the fitting assembly for ensuring that the fitting assembly maintains a leak free seal connection with the associated fluid conduit.

12 Claims, 5 Drawing Sheets

(56) References Cited

OTHER PUBLICATIONS

"Copper and Copper Alloys" by Author Cohen, *Marks' Standard Handbook for Mechanical Engineers,* Tenth Edition, Eugene A. Avallone et al., pp. 6-65 to 6-71 (7 pgs.).
"70 / 30 Copper—Nickel Alloy EC71500 (UNS C71500)", Electralloy, Aug. 1, 2003 (2 pgs.).
"90 / 10 Copper—Nickel Alloy EC70600 (UNS C70600)", Electralloy, Aug. 1, 2003 (2 pgs.).
"Type 316 Stainless Steel", http://www.allstainlessltd.co.uk/info_sheet_316.html, Oct. 5, 2006 (1 pg.).
International Search Report dated Jan. 17, 2007.
EP 06 79 0816.0 Supplementary Search Report, dated Dec. 14, 2011.

* cited by examiner

FITTING WITH COMPLEMENTARY FITTING MATERIALS

CROSS REFERENCE TO RELATED APPLICATIONS

This application claims priority from U.S. Provisional Patent Application Ser. No. 60/725,582 filed Oct. 11, 2005, which is expressly incorporated herein by reference.

BACKGROUND OF THE DISCLOSURE

The present disclosure relates to fluid fittings, and more particularly, to an improved fitting employing complementary fitting materials which allow the fitting to maintain a tight leak seal during and post exposure to extreme heat. In one embodiment, a fitting includes a connector body having a sleeve that receives a tube or pipe therein and includes at least one radially extending seal for sealing and mechanically connecting to the tube or pipe when a swage ring is axially installed on the sleeve. The improved fitting will be described with particular reference to this embodiment, but it is to be appreciated that the improved fitting may relate to other similar environments and applications.

Various types of fittings have been developed for joining tubes and pipes to other tubes and pipes, or to other fluid apparatus such as pumps, fluid motors, actuation cylinders, supply tanks and canisters, etc. For thin walled tubing or pipe, various types of fittings are used which compress against the outside diameter of the tube or pipe to create a seal. One particular type of such a fitting includes a coupling body and a swage ring which is forced over the coupling body to compress it radially inwardly against a tube or pipe received within the coupling body to create a mechanical connection and seal. Generally, this type of fitting has one or more circumferential teeth or ridges on an inside diameter of the coupling body which, when compressed inwardly by a swage ring, engage the outside diameter of the tube or pipe to create one or more leak-tight mechanical connections or joints between the tube or pipe and the fitting. This engagement of the sealing teeth of the fitting with the tube or pipe causes the pipe to be deformed radially inwardly, with the coupling body of the fitting located externally about the tube or pipe.

Examples of such mechanically attached fittings are provided in U.S. Pat. Nos. 4,482,174; 5,110,163; 5,114,191; 6,692,040; and U.S. patent application Ser. No. 11/065,656. One example of an installation tool employable for attaching these types of fittings to a tube or pipe is described in U.S. Pat. No. 5,305,510. All the teachings and substance of these patents are hereby expressly incorporated by reference into the present application.

The assignee of this application, Lokring Technology Corporation, manufactures, sells and/or distributes a variety of such fittings. These fittings often include three (3) circumferential teeth or ridges, typically referred to as seals, including a main seal, an inboard seal and an outboard seal. The particular configuration of the fitting body and/or the swage ring often determines the order in which the seals (including the main, inboard and outboard seals) are forced into deforming contact with the tube or pipe. Some three-seal fittings of Lokring are configured for applying a kick down force to the main seal. Thus, after a particular surface of the swage ring forces the main seal into deforming contact with the tube or pipe, a second, diametrically smaller surface of the swage ring further forces the main seal into the tube or pipe. Like the order in which the inboard and outboard seals deformingly contact the tube or pipe, the sequential order in which the kick down force is applied to the main seal varies from fitting to fitting.

Typically, the fitting body and the swage ring are formed of any of a variety of fitting materials, including, for example, stainless steel, carbon steel, 90/10 copper nickel alloy (90% copper, 10% nickel), and 70/30 copper nickel alloy (70% copper, 30% nickel). These types of mechanical fittings are prevalent in the art, and have proven effective in connecting tubes and pipes formed of any of a variety of materials to one another to provide a fluid or vapor connection. Copper-nickel fittings used in conjunction with a tube or pipe formed of 70/30 copper nickel are often used in environments, such as marine environments, where high corrosion resistance is required and where concern over chloride stress-corrosion cracking prevents use of stainless steel.

Nevertheless, even such 70/30 copper nickel swage mechanical fittings can be inadequate and occasionally prone to failure when employed in these types of environments under certain conditions, such as after exposure to extreme heat which approaches the annealing temperature of 70/30 copper nickel (e.g., between approximately 1200° F. (648° C.) and approximately 1500° F. (815° C.)). As is well-known, annealing is a process involving heating and cooling designed to effect relief of, among other things, residual stress. The construction of the above described swaged mechanical fittings are such that the seal between the fitting and the tube or pipe is maintained by the tensile preload placed on the swage ring and the compressive preload placed on the tube or pipe. If the fitting and tube or pipe is exposed to temperatures which approach or reach the annealing temperature, the preload stresses may have a tendency to relax and develop a gap between the seals and the tube or pipe and leak.

One method proposed to overcome the potential metallurgical shortcomings of the 70/30 copper nickel fitting is to use a swage ring made of a material that does not anneal at the annealing temperature of 70/30 copper nickel. This differing material arrangement is possible because the swage ring does not come into contact with the fluid being conveyed. One such material that can be used for the swage ring is 316 stainless steel. However, and as indicated above, stainless steel is prone to corrode in salt water. Thus, for this type of fitting to work as intended, over extended periods of time, the fitting must be placed in an exterior environment devoid of salt water or salt laden air, a difficult task in the marine environment typically encountered where 70/30 copper nickel tube or pipe is often used.

Accordingly, the present invention provides an improved swage mechanical fitting having complementary materials which overcomes difficulties associated with the prior art while providing better and more advantageous overall results.

SUMMARY OF THE DISCLOSURE

In accordance with one aspect, a fitting assembly for maintaining a leak free seal connection with an associated fluid conduit during and after exposure to extreme heat is provided. The fitting assembly comprises a coupling body including an inside surface defining a bore for receiving the associated fluid conduit. The inside surface engages an outside surface of the associated fluid conduit. At least one seal is formed on the inside surface of the coupling body. At least one ring is annularly disposed on the coupling body urging the at least one seal into the associated fluid conduit to seal and mechanically connect the coupling body to the associated fluid conduit. The coupling body is made of a first corrosion resistant material having a first coefficient of thermal expansion. The at least one ring is made of a complementary second corrosion resistant material having a second larger coefficient of thermal expansion such that the second material will expand at a greater rate than the first material during heating to a first temperature generally exceeding annealing temperatures of both the first material and the second material. The second material contracts at a greater rate than the first material during subsequent cooling to a second temperature below the annealing temperatures thereby restoring compressive and tensile stresses in the associated fluid conduit and the fitting assembly for ensuring that the fitting assembly maintains a leak free seal connection with the associated fluid conduit.

In accordance with another aspect, a method of maintaining a connection between a fitting assembly including a coupling body and a swage ring for axial installation over the coupling body and a fluid conduit during and after exposure to extreme heat generally exceeding an annealing temperature of the fitting assembly is provided. The coupling body is formed from a first corrosion resistant material having a first coefficient of thermal expansion. The coupling body has an interior wall defining a bore therein and a plurality of seals extending radially into the bore from the interior wall. The swage ring is formed from a complementary second corrosion resistant material having a second coefficient of thermal expansion that is greater than the first coefficient of thermal expansion. The swage ring defines a throughhole therethrough. The fluid conduit is inserted through the throughhole of the swage ring and into the bore of the coupling body. The swage ring is axially moved onto the coupling body to seal and mechanically connect the plurality of seals extending radially from the coupling body into the bore with the fluid conduit.

In accordance with yet another aspect, a leakproof fitting assembly comprises a coupling body formed of a first material having a first coefficient of thermal expansion. The coupling body has an inside surface defining a bore for receiving an associated fluid conduit therein. A main seal is formed on the inside surface of the coupling body and extends radially into the bore for sealing and mechanically connecting the coupling body to the associated fluid conduit. An inboard seal is formed on the inside surface of the coupling body and extends radially into the bore for further sealing and mechanically connecting the coupling body to the associated fluid conduit. The inboard seal is axially spaced from the main seal in a direction axially inward relative to a distal end of the coupling body a distance sufficient to allow the main seal and the inboard seal to form seals and mechanical connections by engaging and deforming the fluid conduit without the seals interfering with one another. A swage ring is formed of a second material having a second coefficient of thermal expansion that is greater than the first coefficient of thermal expansion. The swage ring is axially received onto the coupling body to urge the main seal and the inboard seal into the associated fluid conduit to seal and mechanically connect the coupling body to the associated fluid conduit.

Still other aspects will become apparent from a reading and understanding of the detailed description provided hereinbelow.

DETAILED DESCRIPTION OF THE DISCLOSURE

Figure 1:
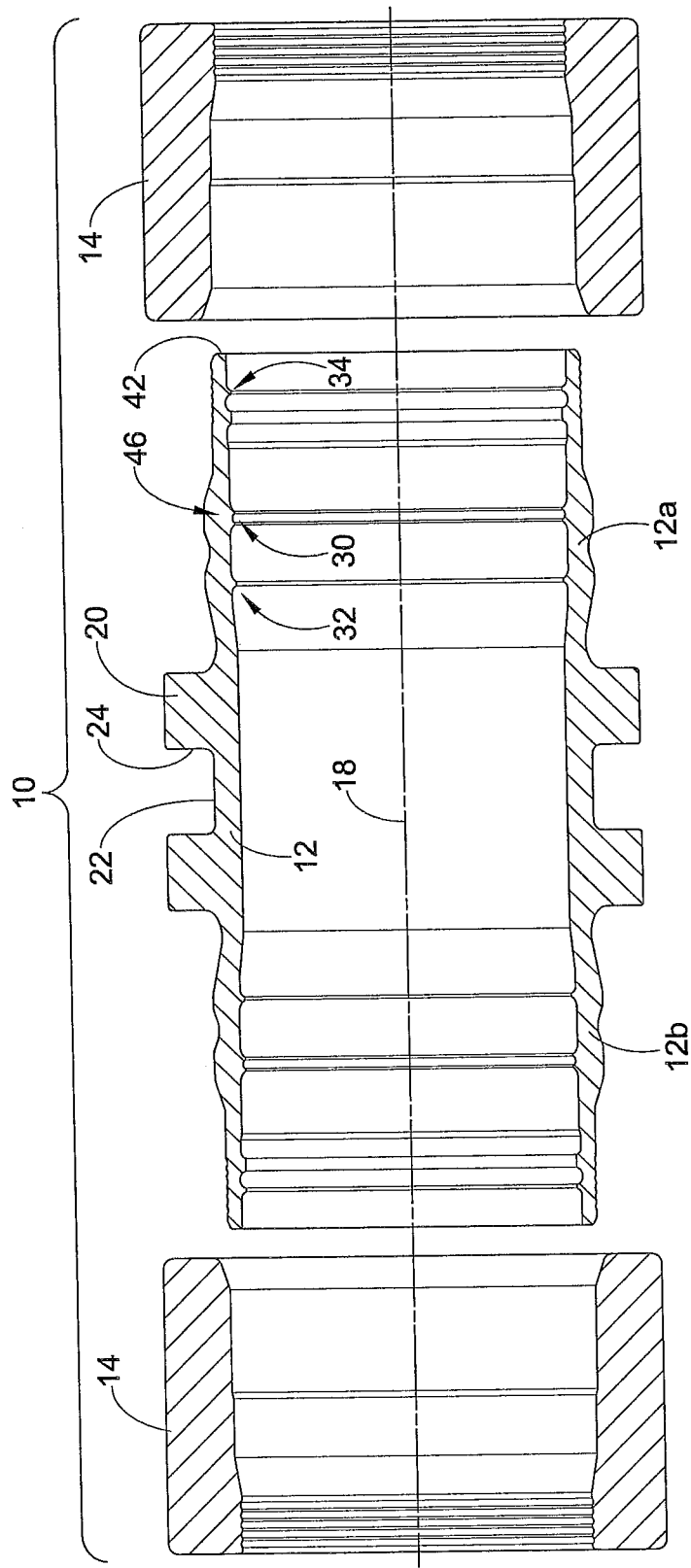
FIG. 1 is a cross-sectional view of a fitting having a coupling body and a pair of swage rings for connecting a first tube or pipe to a second tube or pipe.

It should, of course, be understood that the description and drawings herein are merely illustrative and that various modifications and changes can be made in the structures disclosed without departing from the scope and spirit of the invention. It will also be appreciated that the various identified components of a fitting disclosed herein are merely terms of art that may vary from one manufacturer to another and should not be deemed to limit the present invention. All references to direction and position, unless otherwise indicated, refer to the orientation of the fitting illustrated in the drawings.

Referring now to the drawings, wherein like numerals refer to like parts throughout the several views, an improved fitting or fitting assembly 10 having complementary fitting materials is shown for coupling two sections of tube or pipe together and for providing a leak free seal connection with an associated fluid conduit during and after exposure to extreme heat. With specific reference to FIG. 1, the fitting 10 of the illustrated embodiment includes a coupling or coupling body 12 and at least one swage ring 14 (two in the illustrated embodiment which can be used to couple two sections of coaxial tubing or pipe together). As illustrated, the components 12, 14 of the illustrated fitting 10 are generally axisymmetrical about axis 18. To the extent possible and/or desirable, the fitting 10 can incorporate any one or more features discussed in reference to the fitting embodiment(s) of commonly owned U.S. patent application Ser. No. 11/065,656, expressly incorporated herein by reference.

The coupling body 12, also referred to herein as a connector body, of the illustrated fitting 10 includes first portion or sleeve 12a (which forms the right side of the coupling body in FIG. 1) and a second portion or sleeve 12b (which forms the left side of the coupling body in FIG. 1). The first sleeve 12a is adapted to receive a first section of tube or pipe (such as pipe 16 of FIG. 4) and the second sleeve 12b is adapted to receive a second section of tube or pipe. As will be described in more detail below, when the swage rings 14 are axially forced onto respective sleeves 12a, 12b with the tube or pipe sections received therein, the sleeves become mechanically connected to and sealed with the tube or pipe sections.

Those skilled in the art will understand and appreciate that the exact configuration of the fitting 10 can vary from that shown and described herein. For example, the fitting 10 need not include exactly two sleeves in a coaxial configuration as shown in the illustrated embodiment. In an alternate embodiment, the fitting 10 could be integrally formed or adapted to connect with another component or type of fitting, and may have any number of sleeves extending at various locations therefrom for connecting to one or more corresponding tubes. A particular example could be a combination fitting and ball-valve wherein the fitting 10 is combinable with a ball-valve in a similar manner as described in commonly owned U.S. Pat. No. 6,467,752, expressly incorporated herein by reference.

As will also be understood and appreciated by those skilled in the art, the sleeves 12a, 12b can be generally identical, except that they are axially mirrored relative to one another, and thus only first sleeve 12a will be described in further detail herein. In the illustrated embodiment, the sleeve 12a includes a circumferential flange or ridge 20 extending radially outwardly from exterior outside surface 22 of the body 12. As will be described in more detail below, the ridge 20 includes a tool engaging surface 24 which is used in joining the sleeve 12a to the adjacent swage ring 14 when connecting the fitting 10 to the tube 16 (FIG. 4) received therein. Tube 16 can alternately be referred to as a pipe, pipe section, tube section or the like. As used herein, the terms "pipe," "pipe section," "tube," and "tube section" are used interchangeably and all such components or elements and their equivalents are to be considered within the scope of the present invention.

Figure 2:
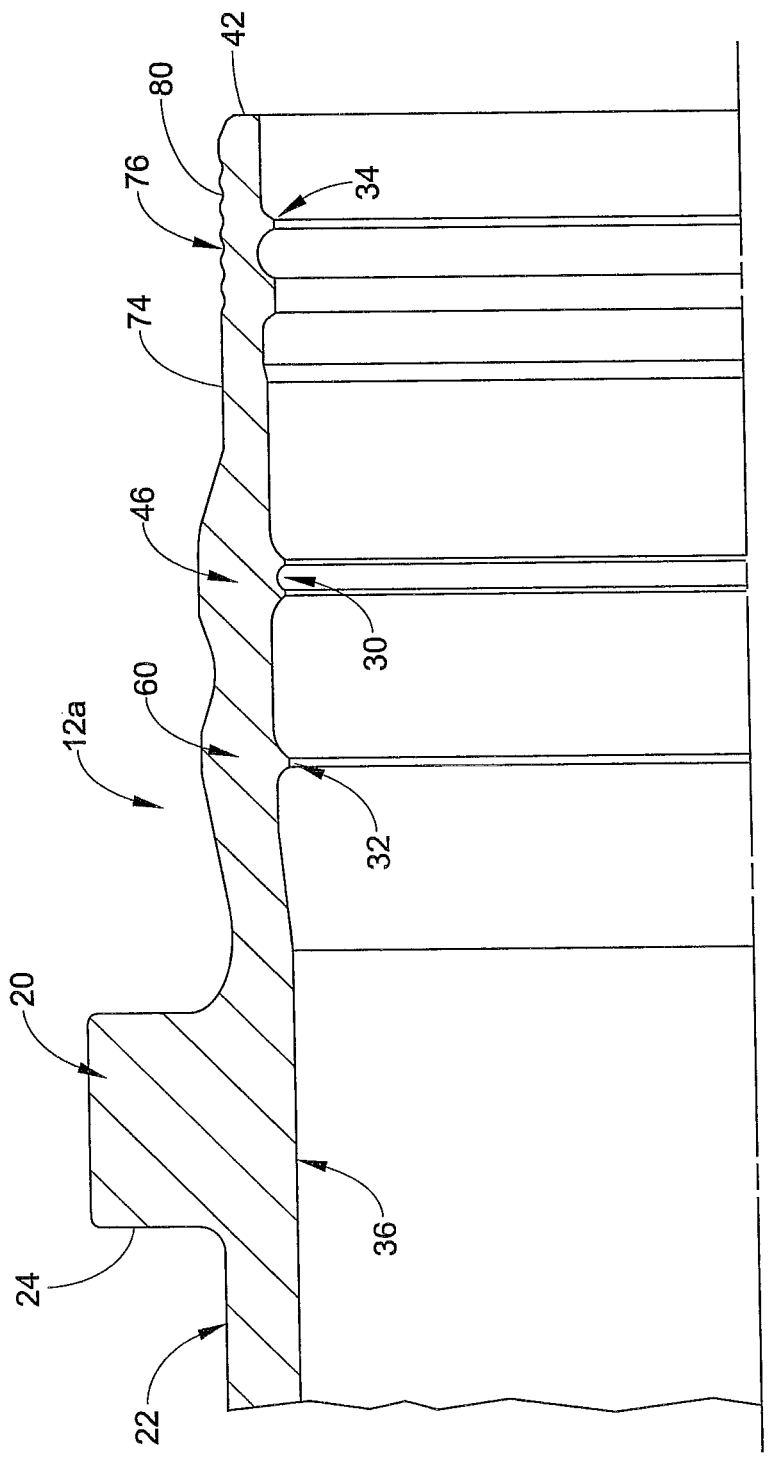
FIG. 2 is an enlarged partial cross-sectional view of the coupling body of FIG. 1.
Figure 4:
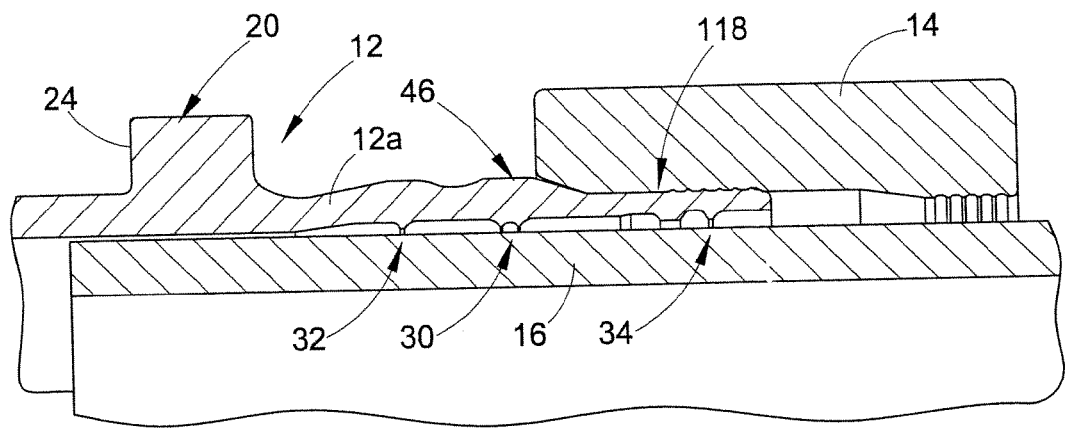
FIG. 4 is partial cross-sectional view of a fitting assembly including the fitting of FIG. 1, a tube or pipe received in the coupling body of the fitting, and one of the swage rings of the fitting shown in a preinstall position on the coupling body.

With additional reference to FIG. 2, the sleeve 12a includes at least one seal formed on an inside or interior surface 36 of the coupling body 12. More particularly, in the illustrated embodiment, the sleeve 12a includes a plurality of spaced apart seals, including main seal 30, inboard or proximal seal 32 and outboard or distal seal 34, each for sealing between and mechanically connecting the coupling body 12 to pipe 16 (FIG. 4). The seals 30, 32, 34 are each positioned on or extend from interior surface 36 of the coupling body 10. As used herein, the terms "proximal" and "distal", as well as the terms "inboard" and "outboard", are used to generally indicate relative axial spacing, such as from the exterior flange 20 or the distal end 42. Thus, the distal or outboard seal 34 is axially spaced relative to the flange 20 a greater distance than is the proximal or inboard seal 32.

The main seal 30 serves to provide a main fluid seal and mechanical connection with the tube or pipe 16, as will be described in more detail below. A main seal compression land 46, also referred to herein as a seal urging feature or projection, can be formed on and extend radially from outside surface 22 adjacent the main seal 30. In the illustrated embodiment, the land 46 is provided and is directly opposite the main seal 30. Adjacent the main seal land 46, the outside surface 22 has a distal portion 74. In particular, the distal portion 74 is formed between the land 46 and the distal end 42 and has a relatively smaller diameter than the land 46, the flange 20 and a portion of the exterior surface 22 adjacent the flange 20. In the illustrated embodiment, the distal portion 74 of the connector body 10 also has a locking mechanism 76 adjacent the distal end 42. The locking mechanism 76 includes a frictional area 80 on an outside surface of the connector body 10 and adjacent the distal end 42 of the connector body. The frictional area 80 limits axial movement of the swage ring 14 relative to the connector body 10 after installation of the swage ring on the connector body.

The inboard or proximal seal 32 is located axially between the main seal 30 and the ridge 20, axially spaced from each. Like the main seal 30, the inboard seal 32 is adapted to provide a fluid seal and a mechanical connection with the tube or pipe 16. An inboard compression land 60, also referred to herein as an inboard or proximal seal urging feature or projection, can be formed on and extend radially from outside surface 22 adjacent inboard seal 32. In the illustrated embodiment, the land 60 is provided and positioned directly opposite the inboard seal 32. When provided, the outboard or distal seal 34 is axially located between the main seal 30 and the distal end 42, axially spaced from each. Like the seals 30, 32, the outboard seal 34 is adapted to provide a fluid seal and a mechanical connection with the pipe 16. The outboard seal 34 is positioned adjacent the distal end 42 and axially spaced inwardly slightly therefrom.

Figure 3:
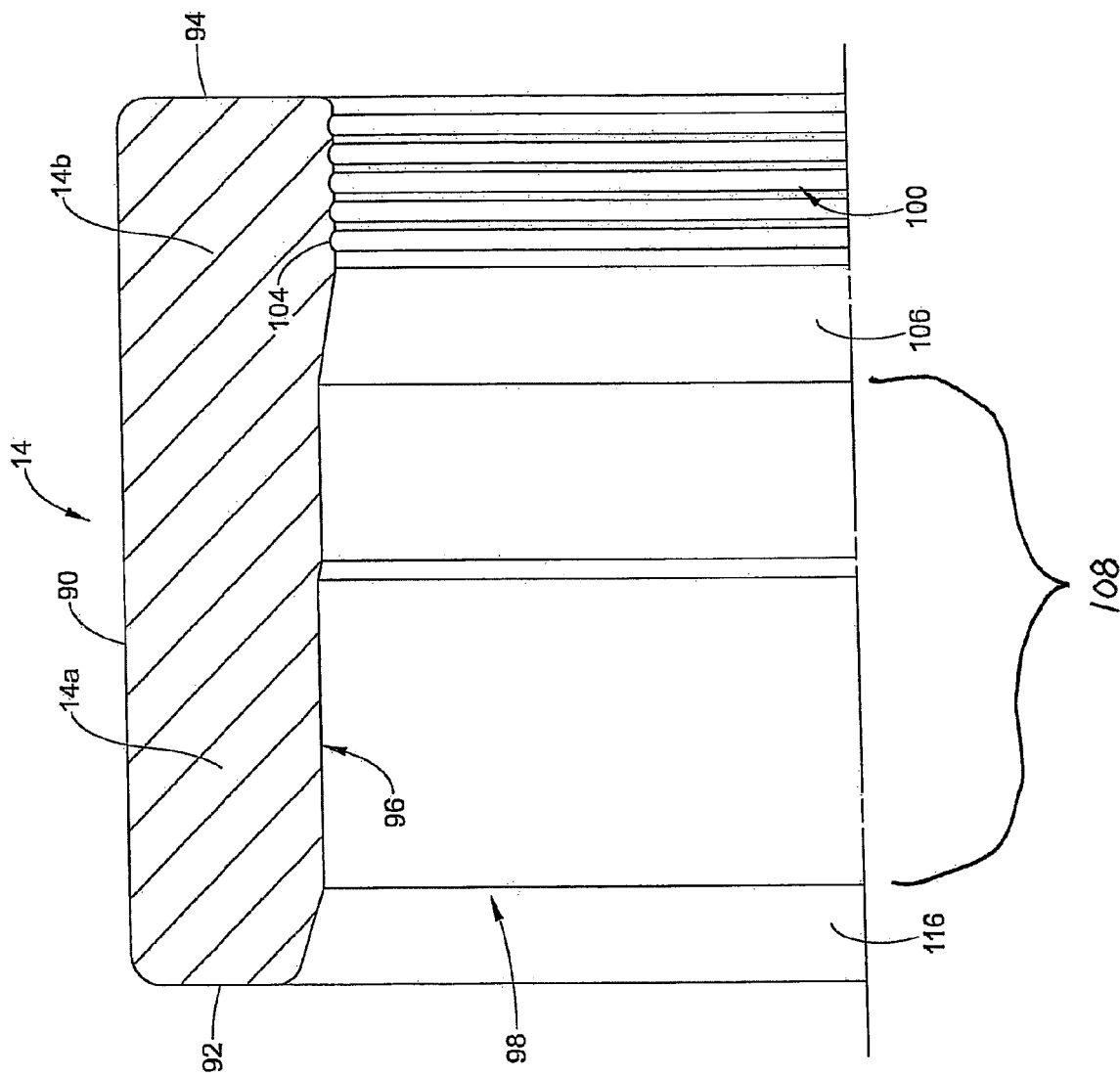
FIG. 3 is an enlarged partial cross-sectional view of one of the swage rings of FIG. 1.

The swage ring 14, also referred to herein as a drive ring, is sized to be annularly received over and axially forced along the sleeve 12a toward the flange 20 for urging the seals 30, 32, 34 into the pipe 16 to seal and mechanically connect the body 12 with the pipe. More specifically, with additional reference to FIG. 3, the swage ring 14 includes a proximal portion 14a and a distal portion 14b. In the illustrated embodiment, the swage ring 14 includes an exterior surface 90 having a relatively constant outside diameter. As illustrated, the distal portion 14b is generally thicker than the proximal portion 14a.

The swage ring 14 of the illustrated embodiment further includes an interior surface 96 defining a throughhole 98 into which the coupling sleeve 12a is received when the ring 14 is installed onto the connector body 12. More particularly, the interior surface 96 includes distal compression section 100 of the swage ring positioned adjacent the distal end 94. In the illustrated embodiment, the compression section 100 includes a locking mechanism 104 which assists in better retaining the swage ring 14 on the connector body 12 when the ring is fully installed on the body 12. The locking mechanism 104 cooperates and/or works in conjunction with the locking mechanism 76 of the connector body 12 to prevent the swage ring 14 from slipping or working off the distal end 42 of the connector body 12. A distal tapered section 106 of the swage ring 14, connects the distal compression section 100 with a proximal compression section 108. A proximal tapered section 116 of the swage ring 14 opens adjacent the proximal end 92 for facilitating easier insertion of the sleeve 12a, and particularly the lands 46,60 of the sleeve 12a, into the throughhole 98 when the ring 14 is installed onto the body 12.

With additional reference to FIG. 4, the swage ring 14 is shown partially installed or preassembled on the connector body 12 in a pre-install or distal position. Through an interference fit 118, the swage ring 14 is maintained and can be shipped to customers in the pre-install position on the connector body 12, which facilitates ease of use and installation by the ultimate end-users.

To fully install the swage ring 14 onto the sleeve 12a with the pipe 16 inserted therein for purposes of mechanically connecting and sealing the fitting 10 to the pipe, an installation tool (not shown) can be used to further force the swage ring 14 onto the sleeve 12a toward the flange 20. One suitable installation tool is described in commonly-owned U.S. Pat. No. 5,305,510, expressly incorporated herein by reference. As will be known and appreciated by those skilled in the art, the installation tool has opposed jaws that engage the tool engaging surface 24 of the flange 20 and the swage ring distal end 94 and are actuated to force or press the swage ring 14 toward the flange 20 to a final installation position (shown in FIG. 9). Axial movement of the swage ring 14 onto the connector body 12 with the pipe 16 inserted therein causes radial movement of the fitting body 12, and particularly the seals 30, 32, 34 of the fitting body, toward or into the pipe 16 to create seals and mechanical connections therewith.

As will be described in more detail below, the connector body 12 (specifically, the connector body sleeve 12a) and the swage ring 14 can be configured so that the seals 30, 32, 34 are sequentially set, one at a time, and can also be configured so that a restoring load force is applied to the main seal 30 after setting of the seals 32,34. The fitting 10 of the illustrated embodiment is structured or configured such that all of the seals 30,32,34 are set in one preferred order as the swage ring is moved from the preinstalled position to the final installed position. That is, there is no deforming contact with the pipe 16 by an un-set seal until the prior seal (none in the case of the main seal) is fully set. Setting of a seal means the seal is swaged or forced into deforming contact with the pipe. Setting of a seal is considered complete (i.e., fully set) when the seal is completely forced into the pipe (i.e., when the exterior surface 22 immediately opposite the seal 30 or 32 or 34 has no further radial movement as a result of being forced inward by a particular section of the swage ring 14). Of course, other configurations of the coupling body 12, seals 30,32,34 and/or swage ring 14 are contemplated wherein alternate setting sequences or orders are employed, including simultaneous setting of two or more seals, and/or the restoring load is either not employed or occurs in a sequence other than that discussed herein.

Figure 5:
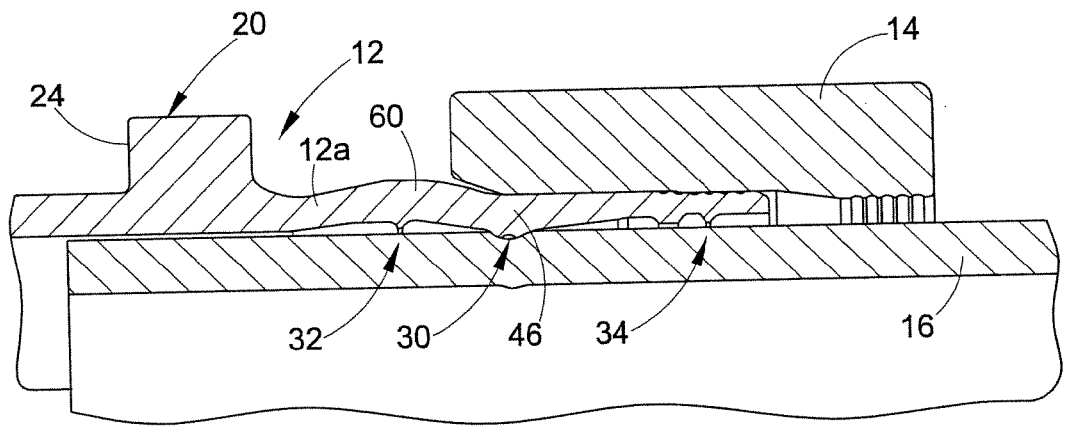
FIG. 5 is a partial cross-sectional view of the fitting assembly of FIG. 4 shown with the swage ring urging a main seal of the coupling body into the tube or pipe.

With reference now to FIGS. 4-9, the illustrated embodiment employs a sequential setting of the seals and application of the restoring force on the main seal wherein the seals are set and kicked-down in the following order: (1) main seal 30; (2) inboard seal 32; (3) outboard seal 34; and (4) kick-down of main seal 30. As shown in FIG. 5, in setting the main seal first, the proximal tapered section 116 initially begins to set the main seal 30 and the proximal compression section 108 following the tapered section fully sets the main seal 30, both by axially moving into the land 46 opposite the main seal 30. No contact occurs between the un-set seals 32, 34 and the pipe 16 until the main seal 30 is fully set.

Figure 6:
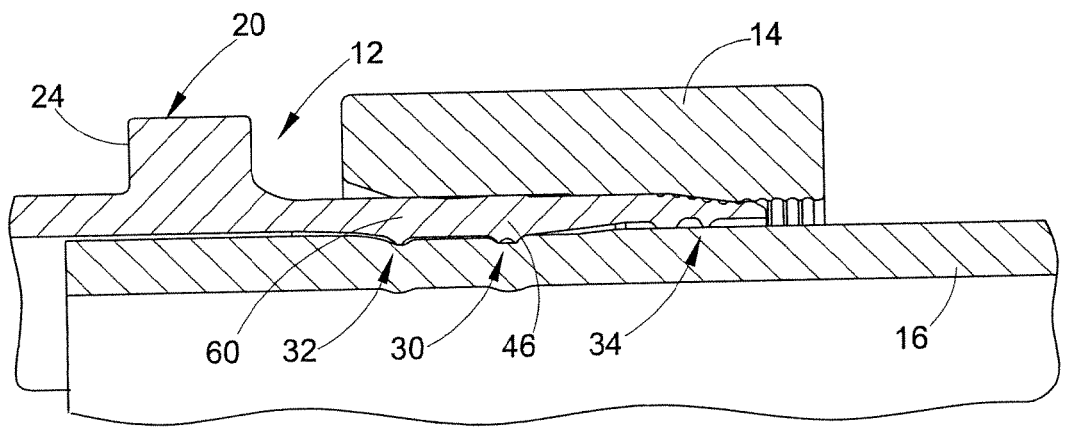
FIG. 6 is a partial cross-sectional view of the fitting assembly of FIG. 4 shown with the swage ring urging an inboard seal of the coupling body into the tube or pipe.
Figure 7:
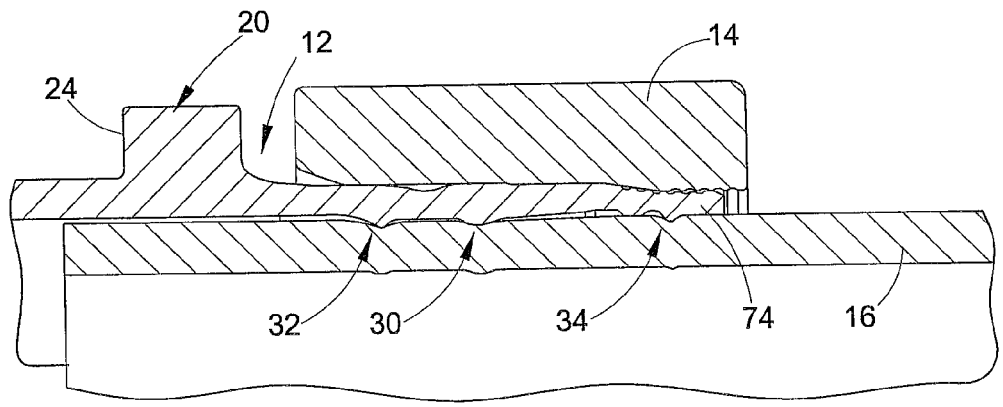
FIG. 7 is a partial cross-sectional view of the fitting assembly of FIG. 4 shown with the swage ring urging an outboard seal of the coupling body into the tube or pipe.

With reference to FIG. 6, the inboard seal 32 is set next. Like the main seal 30, the inboard seal 32 is initially begun setting by the proximal tapered section 116 and is fully set by the proximal compression section 108, both engaging the land 60 opposite the inboard seal 32. Contact may occur between the un-set outboard seal 34 and the pipe during setting of the inboard seal, but no deformation or deforming contact (i.e., setting) of the outboard seal occurs until after the inboard seal 32 is fully set. After full setting of the inboard seal 32, and with reference to FIG. 7, the outboard seal 34 is set, initially by engagement of the tapered section 106 radially into the connector body distal portion 42 and fully by engagement of the distal compression section 100 into the distal portion 42.

Preferably, the design or configuration of the connector body 12 is such that when the swage ring 14 is urged over the coupling body, the main seal 30 is urged into substantial biting and sealing engagement with the outer surface of the pipe 16. In comparison, the outboard seal 34 and the inboard seal 32 are each preferably designed to make at least a minimal bite into the outer surface of the pipe 16. Also preferably, the connector body 12 is configured so that the inboard seal 32 bites into the pipe 16 an amount substantially the same as the outboard seal 34 and both seals 32, 34 bite into the pipe 16 an amount equal to or less than the amount the main seal 30 bites into the pipe 16, particularly after kick-down of the main seal 30. As will be appreciated by those skilled in the art, the inboard and outboard seals 32, 34 function to prevent pivoting or rocking of the pipe 16 about a fulcrum established where the main seal 30 bites into the pipe 16 thereby preventing the pipe 16 from bending or flexing about the main seal 30, thus preventing, or at least reducing the likelihood of, relative motion between the main seal 30 and the pipe 16 and thus leakage at the point where the seal 30 engages the pipe 16.

As described above, when the swage ring 14 is moved axially toward the connector body flange 20 and forced over each of the seals 30, 32, 34, the connector body 12 is forced radially inward and setting of the seals causes the pipe 16 to be deformed radially inwardly. This radial movement of the connector body 12 and the pipe 16 is generally a very local effect, i.e., movement of the one of the seals into the pipe does not have any effect on the remaining seals, nor have any significant effect on the pipe adjacent the remaining seals.

Figure 8:
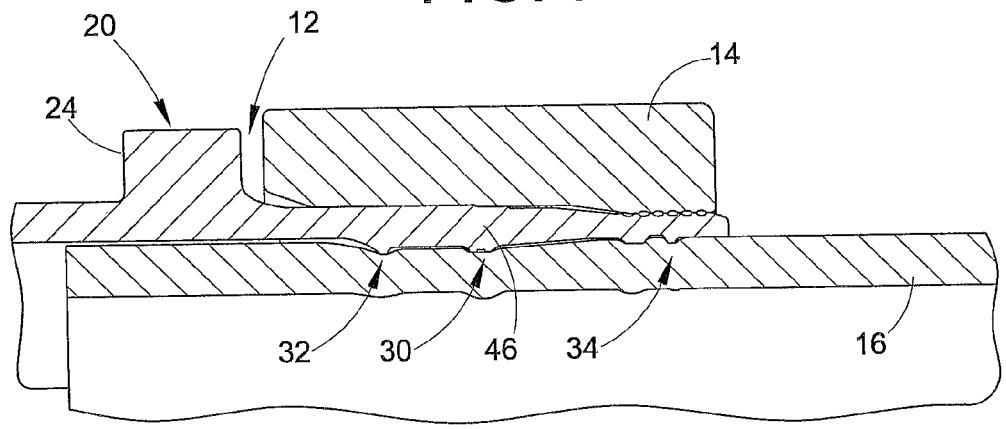
FIG. 8 is a partial cross-sectional view of the fitting assembly of FIG. 4 shown with the swage ring "kicking-down" the main seal into the tube or pipe.

After full setting of the outboard seal 34, continued axial movement of the swage ring 14 toward the connector body flange 20 causes kick-down of the main seal 30. Kick-down of the main seal is more fully described in commonly-owned U.S. Pat. No. 5,709,418, expressly incorporated herein by reference, but will be briefly described herein. As shown in FIG. 8, the second portion of proximal compression section 108 "kicks-downs" the main seal 30 by engagement with the land 46, after full setting of the outboard seal 34.

Figure 9:
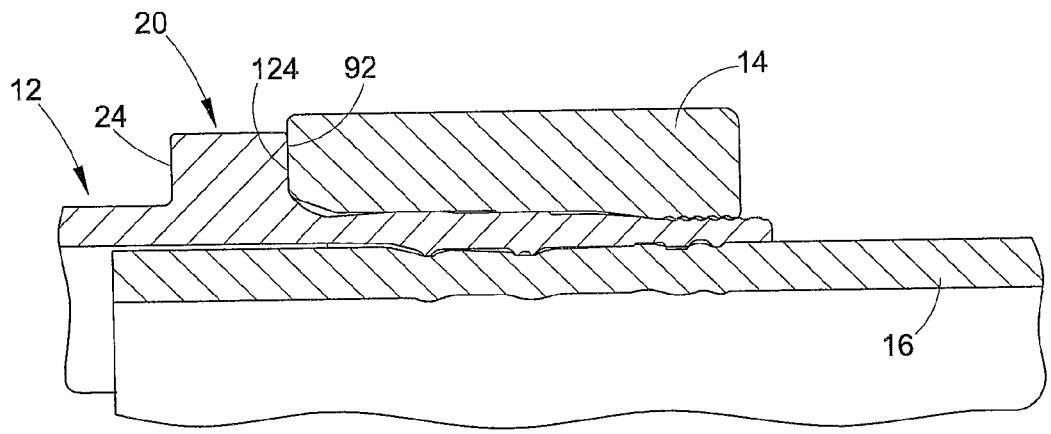
FIG. 9 is a partial cross-sectional view of the fitting assembly of FIG. 4 shown with the swage ring in a fully installed position on the coupling body.

With reference to FIG. 9, the swage ring 14 is further forced axially on the connector body sleeve 12a to the illustrated final install or proximal position. In this position, the swage ring 14 abuts or engages the connector body flange 20. More specifically, the proximal end 92 of the swage ring 14 abuts or engages surface 124 of the flange 20. Alternatively, the swage ring 14 could be positioned closely adjacent the flange 20 without contact therewith. In the final install position, all the seals 30, 32, 34 are set, including kick-down of the main seal 30. Cooperation between the connector body locking mechanism 76 of the distal portion 74 and the swage ring locking mechanism 104 prevents, or at least reduces the likelihood that, the swage ring 14 will axially dislodge itself from the connector sleeve 12a.

Again, as already indicated herein, the fitting 10 need not be limited to the structure or configuration discussed and described herein. For example, the fitting 10 need not have the exact plurality of seals 30,32,34 depicted in the illustrated embodiment, nor the lands 46,60 associated with the seals 30,32. In one alternate embodiment, the outboard seal 34 can be replaced and/or supplemented with an anti-torsion ridge that prevents or limits rotational movement between the coupling body 12 and the swage ring 14. Moreover, the configuration of the coupling body 12 and/or the swage ring 14 need not set whatever seals are incorporated in the fitting 10 in the order described in reference to the illustrated embodiment. Still further, the configuration of the coupling body 12 and/or the swage ring 14 need to employ the kickdown feature for applying a restoring load to one of the seals.

As previously indicated generally, the coupling body 12 and the swage ring 14 can be formed of any of a variety of fitting materials, including, for example, stainless steel, carbon steel, 90/10 copper nickel alloy, and 70/30 copper nickel alloy, etc. For marine environment applications, the coupling body 12 and the swage ring 14 are typically (i.e., conventionally) made from 70/30 copper nickel for connecting tubes and pipes also formed of 70/30 copper nickel to each other to provide a fluid or vapor connection therebetween.

In certain marine environment applications, specifically fittings for use by the United States Navy in certain pipeline systems, only approved mechanically attached fittings that have passed the fire test requirements set forth by The American Society of Testing Materials, particularly ASTM F1387-99, *Standard Specification for Performance of Piping and Tubing Mechanically Attached Fittings*, ASTM International, including the *Supplementary Requirements*, where applicable, shall be used in fire hazardous areas. ASTM F1387-99 establishes the performance characteristics required for mechanically attached fittings for use in piping and tubing systems. The Fire Test outlined in ASTM F1387-99, Section S7, requires that a fitting attached to a tube or pipe, during and post fire, must maintain a leak tight seal.

To perform the Fire Test, an assembled fitting and matching tube or pipe are placed in a furnace and heated to a temperature approximating 1730° F. (943° C.). At this temperature, mechanical fittings made from 70/30 copper nickel have occasionally been prone to failure because the test temperature exceeds the annealing temperature of 70/30 copper nickel (between approximately 1200° F. (648° C.) and approximately 1500° F. (815° C.)). The construction of the above described swaged mechanical fittings are such that the seal between the fitting and the tube or pipe is maintained by the tensile preload placed on the swage ring and the compressive preload placed on the tube or pipe. If the fitting and tube or pipe is exposed to temperatures which exceed the fitting's annealing temperature, the preload stresses have a tendency to relax and develop a gap between the seals and the tube or pipe and leak.

As indicated in the Background section above, one method to overcome the metallurgical shortcomings of the 70/30 copper nickel fitting is to use a swage ring made of a material that does not anneal at the annealing temperature of 70/30 copper nickel. One such material that can be used for the swage ring is 316 stainless steel, which has an annealing temperature between approximately 1850° F. (1010° C.) and approximately 2050° F. (1120° C.). However, stainless steel is prone to corrode in salt water. Thus, for this type of fitting to work as intended, over extended periods of time, the fitting must be placed in an exterior environment devoid of salt water or salt laden air, a difficult task in the marine environment typically encountered where 70/30 copper nickel tube or pipe is used.

In accordance with the present disclosure, one solution to the stainless steel problem is the use of a swage ring made from 90/10 copper nickel that is equally resistant as the 70/30 copper nickel to corrosive attack. In addition, 90/10 copper nickel may be superior to stainless steel in low flowing situations such as the exterior surface of the fitting (as opposed to the high flowing interior of the fitting). Notwithstanding the fact that the annealing temperature for this 90/10 alloy (between approximately 1100° F. (593° C.) and approximately 1500° F. (815° C.)) is also lower than the Fire Test furnace temperature (which use would seem to be unsuitable for the U.S. Navy for the same reasons that the 70/30 Copper Nickel fitting would be unsuitable), a small but significant difference in the coefficients of thermal expansion exists between the two materials.

Coefficients of thermal expansion of a material are complicated and can vary dramatically as the actual temperature varies, but defines the relationship of the change in size of a material as the temperature of the material changes. A coefficient of thermal expansion is the fractional increase in length per unit rise in temperature. It can be defined at a precise temperature or over a temperature range. Thermal expansion and contraction are important considerations in design, and are often overlooked. Expansion-contraction problems often arise when two or more parts made of materials having different coefficients of thermal expansion are assembled and thereafter exposed at an elevated temperature other than that of the end-use environment. The two materials can react differently at the elevated temperature and the resultant thermal stresses can cause unexpected part failure.

As will be appreciated by one skilled in the art, the coefficient of thermal expansion for 70/30 copper nickel alloy in the range of temperature from approximately 68° F. (20° C.) to approximately 572° F. (300° C.) is approximately $9.0 \times 10^{-6}$ in./° F. ($16.2 \times 10^{-6}$ m/° C.). The thermal expansion coefficient for 90/10 copper nickel in the same range of temperature is approximately $9.5 \times 10^{-6}$ in./° F. ($17.1 \times 10^{-6}$ m/° C.). Thus, the complementary 90/10 copper nickel swage ring will expand slightly more than both the 70/30 copper nickel tube or pipe and the 70/30 copper nickel coupling body upon exposure to a temperature exceeding the annealing temperatures of both alloys. When this mixed material fitting is subjected to the ASTM Fire Test described above, both materials will have the tendency to anneal at the tested temperatures during the heating phase. As the fire is extinguished and the temperature subsequently cools to a temperature below the annealing temperatures, the swage ring made of the 90/10 copper nickel alloy will contract at a greater rate than both the coupling body and tube or pipe made of the 70/30 copper nickel alloy (i.e. at a rate of approximately $0.5 \times 10^{-6}$ in./° F. ($1.0 \times 10^{-6}$ m/° C.)). This will re-establish the tensile load which will, in turn, re-establish the compressive preload exerted by the tube or pipe. The positive result of this action restores the compressive and tensile forces initially present in the fitting/tube or pipe assembly and also ensures that the assembly remains leak tight. Thus, the requirement of a fitting attached to a tube or pipe maintaining a leak tight seal during and post fire is met with compatible materials which do not compromise the corrosion capabilities of the assembly.

It will also be appreciated by one skilled in the art that another feature of the 90/10-70/30 copper nickel combination is the reduced cost of the 90/10 copper nickel material portion of the fitting. As is well known, nickel is more expensive than copper, and the 90/10 copper nickel alloy, by virtue of its lower nickel content, is a less expensive material.

It will be appreciated that the above 90/10-70/30 copper nickel fitting is only an example of the present disclosure and that other corrosion resistant, complementary and compatible materials having differing coefficients of thermal expansion can be used to meet the requirement of a fitting attached to a tube or pipe maintaining a leak tight seal during and subsequent to exposure to a temperature generally exceeding annealing temperatures of the fitting.

It will also be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the present disclosure insofar as they come within the scope of the appended claims or the equivalents thereof.

What is claimed is:

1. A fitting assembly for maintaining a leak free seal connection with an associated fluid conduit during and after exposure to extreme heat, the fitting assembly comprising:
   a coupling body including an inside surface defining a bore for receiving the associated fluid conduit, said inside surface engaging an outside surface of the associated fluid conduit;
   a plurality of spaced apart seals including a main seal, an inboard seal, and an outboard seal each formed on said inside surface of said coupling body; and
   at least one ring annularly disposed on said coupling body urging said main, inboard, and outboard seals into the associated fluid conduit to seal and mechanically connect said coupling body to the associated fluid conduit;
   wherein said coupling body is made of a first corrosion resistant material having a first coefficient of thermal expansion and said at least one ring is made of a complementary second corrosion resistant material having a second larger coefficient of thermal expansion such that said second material will expand at a greater rate than said first material during heating to a first temperature exceeding annealing temperatures of both said first material and said second material, and said second material contracts at a greater rate than said first material during subsequent cooling to a second temperature below said annealing temperatures thereby restoring compressive and tensile stresses in the associated fluid conduit and said fitting assembly for ensuring that said fitting assembly maintains a leak free seal connection with the associated fluid conduit, wherein said first material includes approximately 70% copper and wherein the second material includes greater than 70% copper.

2. The fitting assembly of claim 1, wherein said first material includes approximately 30% nickel.

3. The fitting assembly of claim 1, wherein said first coefficient of thermal expansion of said first material is generally equal to a coefficient of thermal expansion of a material of the associated fluid conduit.

4. The fitting assembly of claim 1, wherein said second material includes approximately 90% copper and approximately 10% nickel.

5. The fitting assembly of claim 4, wherein said first material includes approximately 30% nickel.

6. The fitting assembly of claim 1, wherein said main seal is formed on said inside surface of said coupling body that seals and mechanically connects to the associated fluid conduit when said at least one ring is installed on said coupling body.

7. The fitting assembly of claim 6, wherein said inboard seal and said outboard seal are both formed on said inside surface of said coupling body, both said inboard and said outboard seals are axially spaced in opposite directions from said main seal and, together with said main seal, seal and mechanically connect to the associated fluid conduit when said at least one ring is installed on said coupling body.

8. The fitting assembly of claim 7, wherein at least one of said coupling body and said at least one ring being configured to apply a restoring load to said main seal to further seal and mechanically connect said main seal to the associated fluid conduit after said outboard seal and said inboard seal seal and mechanically connect to the associated fluid conduit.

9. The fitting assembly of claim 1 further including a seal land formed on an outside surface of said coupling body adjacent said at least one seal, said at least one ring engaging said at least one seal land to force said at least one seal into engagement with an outer surface of said fluid conduit.

10. A leakproof fitting assembly, comprising:
a coupling body formed of a 70/30 copper nickel alloy having a first coefficient of thermal expansion, said coupling body having an inside surface defining a bore for receiving an associated fluid conduit therein;
a plurality of spaced apart seals including a main seal, an inboard seal, and an outboard seal each formed on said inside surface of said coupling body and extending radially into said bore for sealing and mechanically connecting said coupling body to the associated fluid conduit;
the inboard seal formed on said inside surface of said coupling body and extending radially into said bore for further sealing and mechanically connecting said coupling body to the associated fluid conduit, said inboard seal axially spaced from said main seal in a direction axially inward relative to a distal end of said coupling body a distance sufficient to allow said main seal and said inboard seal to form seals and mechanical connections by engaging and deforming said fluid conduit without said seals interfering with one another; and
a swage ring formed of a 90/10 copper nickel alloy having a second coefficient of thermal expansion that is greater than said first coefficient of thermal expansion such that said second material will expand at a greater rate than said first material during heating to a first temperature exceeding annealing temperatures of both said first material and said second material, and said second material contracts at a greater rate than said first material during subsequent cooling to a second temperature below said annealing temperatures thereby restoring compressive and tensile stresses in the associated fluid conduit and said fitting assembly for ensuring that said fitting assembly maintains a leak free seal connection with the associated fluid conduit, said swage ring axially received onto said coupling body to urge said main seal and said inboard seal into the associated fluid conduit to seal and mechanically connect said coupling body to the associated fluid conduit.

11. The leakproof fitting assembly of claim 10, wherein said coupling body includes a frictional area on an outside surface of said coupling body and adjacent a distal end of said coupling body, said frictional area for limiting axial movement of said swage ring relative to said coupling body after installation of said swage ring on said coupling body.

12. The leakproof fitting assembly of claim 10 wherein said first and second materials are corrosion resistant materials.

\* \* \* \* \*